United States Patent [19]

Enegren

[11] Patent Number: 5,098,744
[45] Date of Patent: Mar. 24, 1992

[54] METHOD FOR CLEANING METALLIC WHEELS

[75] Inventor: Paul L. Enegren, Wichita, Kans.

[73] Assignees: Viking Corp., Wichita, Kans.; International Marketing, Inc., Chambersburg, Pa.

[21] Appl. No.: 422,901

[22] Filed: Oct. 18, 1989

Related U.S. Application Data

[62] Division of Ser. No. 69,324, Jun. 18, 1987.

[51] Int. Cl.⁵ .................................. B05D 3/12
[52] U.S. Cl. ........................... 427/327; 427/388.1; 134/123; 134/134; 198/468.6
[58] Field of Search .............. 134/123, 134, 25.4; 427/327, 388.1; 198/786, 468.6, 346.2

[56] References Cited

U.S. PATENT DOCUMENTS

| | | |
|---|---|---|
| 1,151,969 | 8/1915 | Schock . |
| 2,154,843 | 4/1939 | Hammell ........................ 51/420 |
| 2,249,677 | 7/1941 | Wallace . |
| 2,249,678 | 7/1941 | Wallace . |
| 2,341,674 | 2/1944 | Wallace . |
| 2,542,955 | 2/1951 | Young et al. . |
| 2,724,929 | 11/1955 | Moore ........................... 51/424 |
| 2,802,586 | 8/1957 | Wingard ..................... 198/468.6 |
| 2,925,689 | 2/1960 | Peterson ......................... 51/5 F |
| 3,108,299 | 10/1963 | Baldwin ......................... 134/123 |
| 3,252,401 | 5/1966 | Smith . |
| 3,312,567 | 1/1967 | Sharpe . |
| 3,362,109 | 1/1968 | Wallace ........................... 51/424 |
| 3,475,936 | 10/1969 | Steele ............................... 72/23 |
| 3,508,997 | 4/1970 | Werling ........................... 118/72 |
| 3,526,208 | 9/1970 | Solomin et al. ................ 118/73 |
| 3,546,816 | 10/1971 | Enegren ............................. 51/9 |
| 3,742,650 | 7/1973 | Graf et al. ....................... 51/5 R |
| 3,797,174 | 3/1974 | Hazlewood ..................... 51/422 |
| 3,906,894 | 9/1975 | Pesapane ...................... 118/315 |
| 4,037,364 | 7/1977 | Freeman et al. ................ 51/420 |
| 4,096,300 | 6/1978 | William et al. ................. 427/292 |
| 4,216,738 | 8/1980 | Muta ............................... 118/72 |
| 4,228,671 | 10/1980 | Skeen .............................. 72/53 |
| 4,268,206 | 5/1981 | Johnson ......................... 414/222 |
| 4,311,111 | 1/1982 | Inaba .............................. 118/56 |
| 4,604,881 | 8/1986 | Lienert ............................ 72/53 |
| 4,668,358 | 5/1987 | Ball .............................. 204/150.2 |
| 4,744,720 | 5/1988 | Kremar ......................... 198/468.6 |
| 4,763,392 | 8/1988 | Fogal et al. .................... 29/159.1 |
| 4,950,505 | 8/1990 | Fogal ............................. 427/327 |

FOREIGN PATENT DOCUMENTS 182846  10/1983  Japan .................................. 414/417

OTHER PUBLICATIONS

Viking Brochure Aug. 11, 1986.

*Primary Examiner*—P. W. Echols
*Attorney, Agent, or Firm*—John Wade Carpenter

[57] ABSTRACT

An apparatus for washing and cleaning metallic wheels comprising an apparatus that washes a metallic wheel, and an apparatus that subsequently cleans the washed metallic wheel. A house is provided wherein the cleaned and washed metallic wheel may be painted. A pair of rotating transport cylinders is provided in order to transport the metallic wheel from the apparatus for washing the metallic wheel to the apparatus for cleaning the metallic wheel, and subsequently from the apparatus for cleaning the metallic wheel to the house where the metallic wheel may be painted. A method for washing and cleaning a metallic wheel which includes elevating the metallic wheel from a supporting surface to a level generally horizontal to a pair of cylinders rotatable supported by a conveying frame, and rolling the metallic wheel across the pair of cylinders and into a washing chamber. The metallic wheels is washed in the washing chamber, and after washing, a discharge bar pivots within the washing chamber to push or roll the washed metallic wheel onto the pair of cylinders.

15 Claims, 11 Drawing Sheets

METHOD FOR CLEANING METALLIC WHEELS

This is a divisional application of copending application Ser. No. 07/069,324 filed June 18, 1987.

1. Field of the Invention

This invention is related to an apparatus and method for cleaning metallic wheels such as tire rims and the like. More specifically, this invention is related to an apparatus for washing a metallic wheel; and to an apparatus for cleaning metallic wheels in preparation for painting; and to a combination of apparatuses which wash and clean metallic wheels such that the metallic wheels can be painted in a housing.

2. Description of the Prior Art

Commonly owned U.S. Pat. No. 3,797,174 by Hazlewood teaches a shot cleaning machine. This U.S. Patent is incorporated herein by reference thereto. U.S. Patent No. 2,154,843 by Hammell teaches an abrading apparatus. U.S. Pat. No. 3,508,997 by Werling discloses a method and apparatus for cleaning and reconditioning of material containing cans. U.S. Pat. No. 3,526,208 by Solomin et al describes an appliance for formation of coatings on lateral surfaces of metal parts. U.S. Pat. No. 4,037,364 to Freeman et al teaches a method and means for continuous surface treatment of work pieces. None of the foregoing prior art teach or suggest the particular apparatuses and method of this invention.

SUMMARY OF THE INVENTION

The present invention accomplishes its desired objects by broadly providing an apparatus for cleaning metallic wheels and the like comprising:
(a) a means for washing a metallic wheel;
(b) a means for cleaning a metallic wheel with shot;
(c) a housing wherein a metallic wheel may be painted; and
(d) a means, cooperating with the means for washing and the means for cleaning and the housing, for conveying a metallic wheel from the means for washing to the means for cleaning and to the housing wherein a metallic wheel may be painted.

The present invention further accomplishes its desired object by an apparatus for washing a metallic wheel and the like comprising a washing chamber; a washing chamber door slidably secured to the washing chamber; a discharge conduit means secured to the washing chamber for dispensing washing fluid onto a metallic wheel; a pump means supported by the washing chamber for pumping washing fluid through the discharge conduit means; a means, supported by the washing chamber, for heating washing fluid; a means, secured to the washing chamber, for supporting a metallic wheel while the same is being washer; and a means, pivotally secured to the washing chamber, for discharging a metallic wheel from the washing chamber.

The present invention yet further accomplishes its desired objects by further broadly providing an apparatus for cleaning a metallic wheel and the like comprising a cleaning chamber including a sump means; a cleaning chamber door slidably secured to the cleaning chamber; a means, secured to the cleaning chamber, for supporting a metallic wheel while the same is being cleaned; a means, pivotally secured to the cleaning chamber, for discharging a metallic wheel from the cleaning chamber; and at least one means rotatably mounted in the sump means for impelling shot upwardly against a metallic wheel positioned in the cleaning chamber.

The present invention still yet further accomplishes its desired objects by still further broadly providing a method for washing and cleaning a metallic wheel and the like comprising the steps of:
(a) elevating a metallic wheel from a supporting surface to a level generally horizontal to pair of cylinders rotatably supported by a conveying frame;
(b) rolling the metallic wheel across the pair of cylinders and into a washing chamber;
(c) washing the metallic wheel in the washing chamber; and
(d) pivoting a discharge bar means that is pivotally mounted to a pair of sidewalls of the washing chamber to push the washed metallic wheel onto the pair of cylinders.

Therefore, it is an object of the present invention to provide an apparatus for washing a metallic wheel.

It is another object of the present invention to provide an apparatus for abrasively cleaning a metallic wheel.

It is yet another object of the present invention to provide a method for washing and cleaning a metallic wheel.

These, together with the various ancillary objects and features which will become apparent to those skilled in the art as the following description proceeds, are attained by these novel apparatuses and method, a preferred embodiment being shown with reference to the accompanying drawings, by way of example only, wherein:

BRIEF DESCRIPTION OF THE DRAWINGS

FIG. 1 is a front elevational view of the apparatus for cleaning, washing, and painting metallic wheels and the like;

FIG. 10 is a front elevational view of the cleaning apparatus of this invention which abrasively cleans metallic wheels and the like;

DETAILED DESCRIPTION OF THE INVENTION

Figure 1:
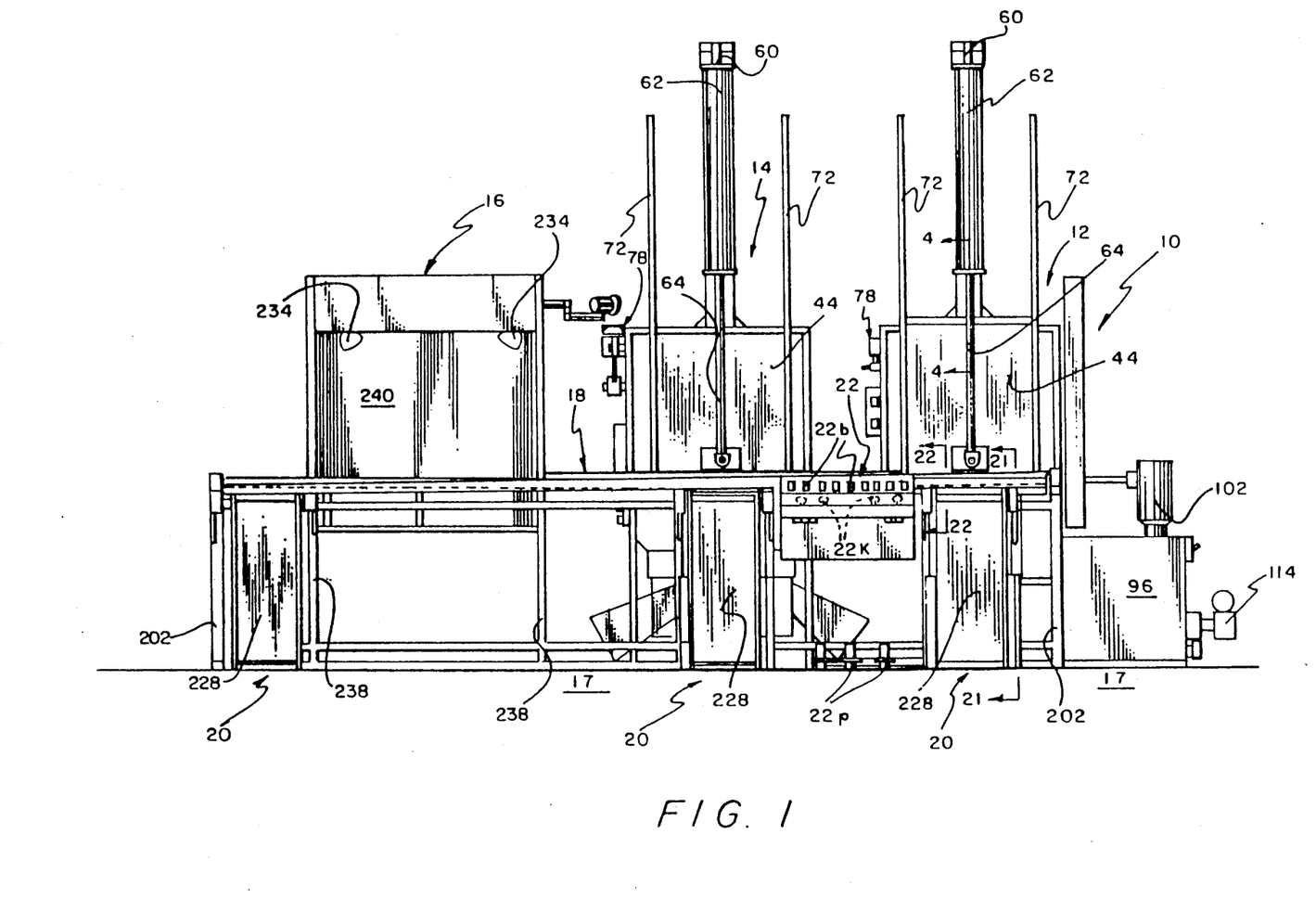
Figures 2, 3, 4, 5, 6, 7:
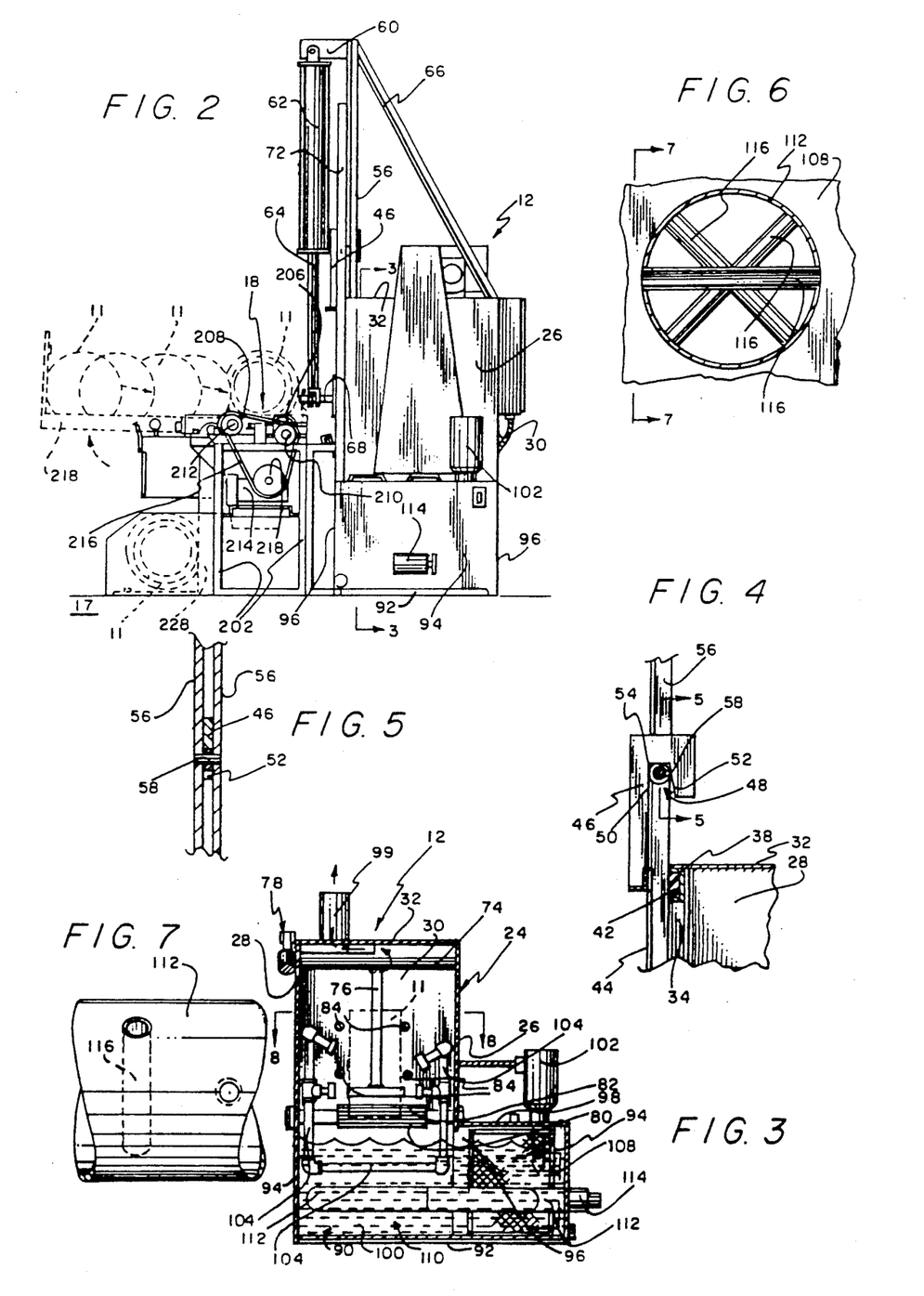
FIG. 2 is a side elevational view of the apparatus of FIG. 1 with the elevator platforms depicted in a horizontal position as dotted lines.
FIG. 3 is a vertical sectional view taken in direction of the arrows and along the plane of line 3—3 in FIG. 2.
FIG. 4 is a partial vertical sectional view taken in direction of the arrows and along the plane of line 4—4 in FIG. 1.
FIG. 5 is a partial vertical sectional view taken in direction of the arrows and along the plane of line 5—5 in FIG. 4.
FIG. 6 is a partial vertical sectional view taken in direction of the arrows and along the plane of line 6—6 in FIG. 3.
FIG. 7 is a partial vertical view taken in direction of the arrows and along the plane of line 7—7 in FIG. 6.
Figure 8:
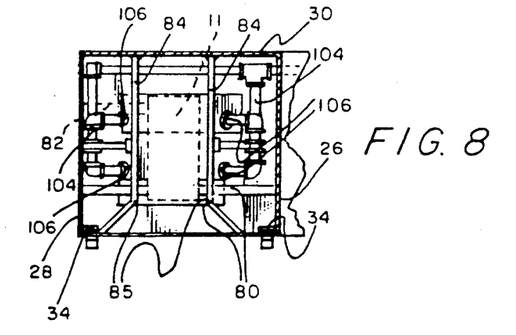
FIG. 8 is a horizontal sectional view taken in direction of the arrows and along the plane of line 8—8 in FIG. 3.
Figure 9:
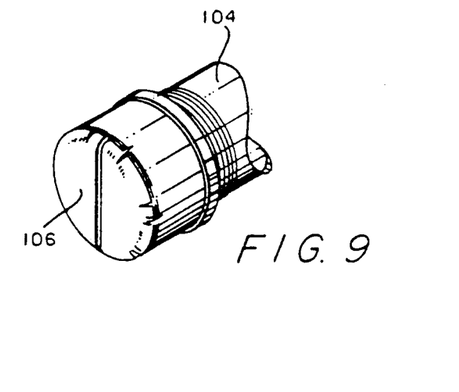
FIG. 9 is a perspective view of a nozzle attached to the conduit.
Figure 11:
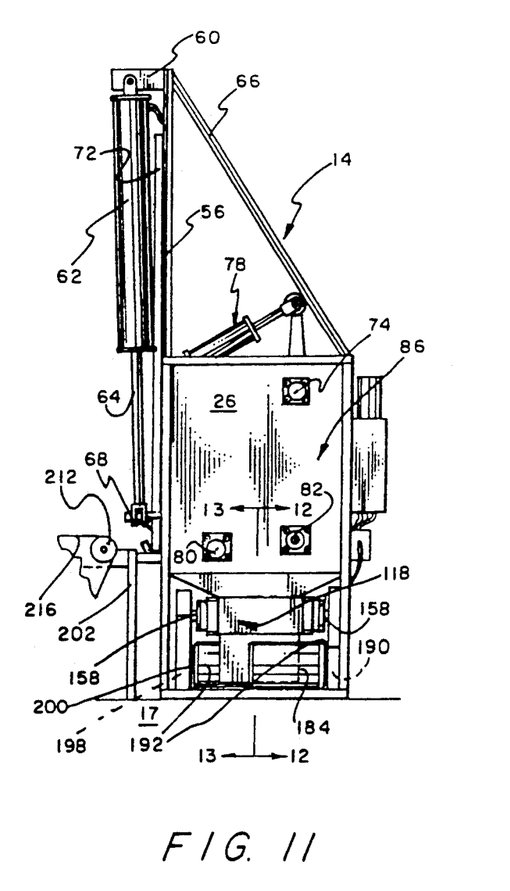
FIG. 11 is a side elevational view of the cleaning apparatus of FIG. 10.
Figures 27, 28, 29:
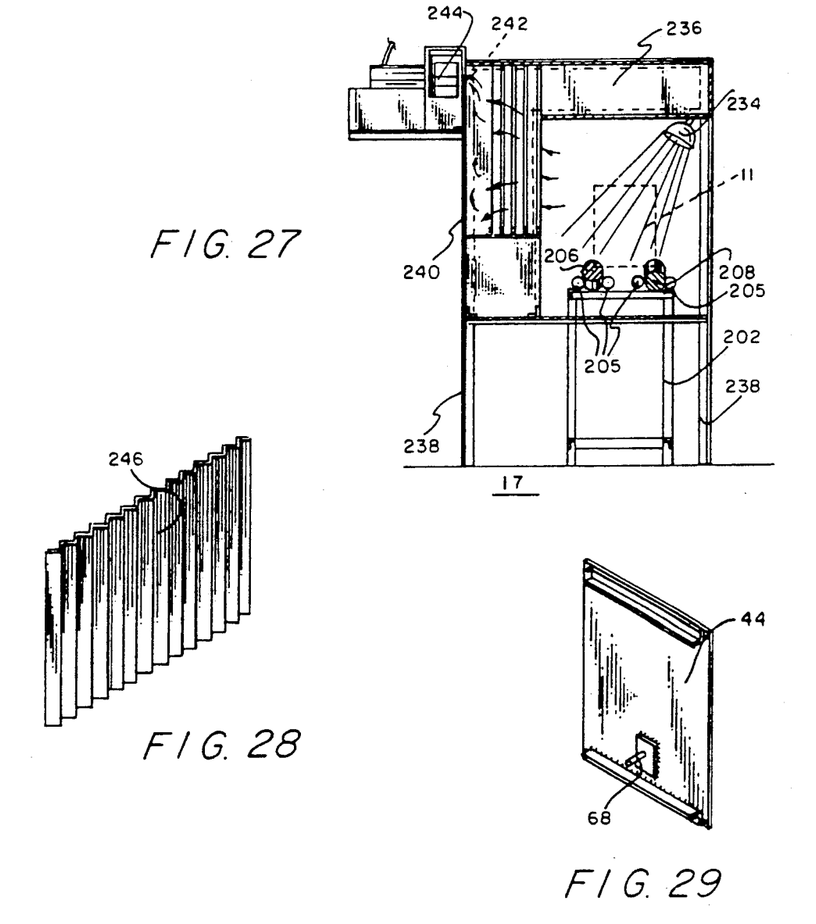
FIG. 27 is a vertical sectional view taken in direction of the arrows and along the plane of line 27—27 in FIG. 26.
FIG. 28 is a perspective view of the filter that is mounted in the back of the house of FIGS. 26 and 27.
FIG. 29 is a perspective view of the door that is employed in the washing chamber and the cleaning chamber.
Figures 30, 31:
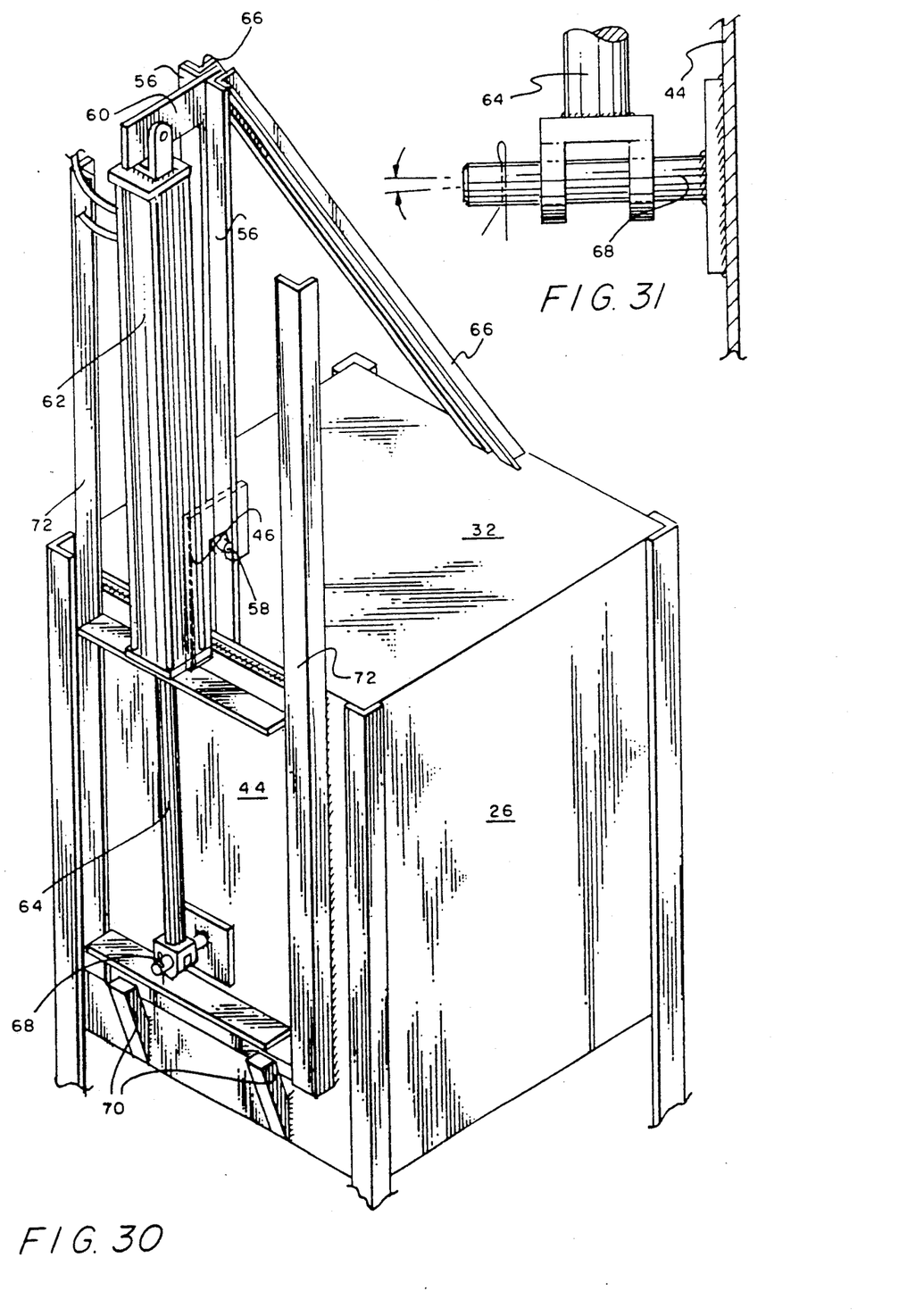
FIG. 30 is a perspective view of the washing chamber or the cleaning chamber.
FIG. 31 is an exploded partial view disclosing the end of the piston, which raises and lowers the door, as being slidably engaged to a lug bar that slants downwardly and away from the door.

Referring in detail now to the drawings wherein similar parts of the invention are identified by like reference numerals, there is seen an apparatus, generally illustrated as 10, embodying the principles of the present invention. The apparatus 10 washes metallic wheels 11 (e.g. tire rims and the like), cleans abrasively the washed metallic wheels 11, and subsequently provides for the abrasively cleaned metallic wheel 11 to be transported or conveyed to a location where the same may be painted or otherwise treated. To accomplish its functions, the apparatus 10 comprises a means, generally illustrated as 12, for washing a metallic wheel 11; a means, generally illustrated as 14, for cleaning a metallic wheel 11 with shot and the like; and a housing, generally illustrated as 16, wherein a metallic wheel 11 may be painted or otherwise treated. The means for washing 12, the means for cleaning 14; and the housing 16 rest upon a horizontal supporting surface 17 representing a foundation 17. Cooperating with the means for washing 12, the means for cleaning 14 and the housing 16, is a means, generally illustrated as 18, for conveying a metallic wheel 11. The means for conveying 18 extends across the fronts of the means for washing 12, the means for cleaning 14, and through the housing 16 as illustrated in FIGS. 1 and 27. Preferably the means for conveying 18 is bound to both the means for washing 12 and the means for cleaning 14 as illustrated in FIGS. 2 and 11. The means for conveying 18 functions to convey a washed metallic wheel 11 from the means for washing 12 to the means for cleaning 14. After the metallic wheel 11 has been cleaned, the means for conveying 18 further functions to transport a washed and cleaned metallic wheel 11 from the means for cleaning 14 into the housing 16 wherein the washed and cleaned metallic wheel 11 may be painted or treated similarly. Pivotally secured to the means for conveying 18 is a means for elevating, generally illustrated as 20, for elevating a metallic wheel 11 from the supporting surface up to the means for conveying 18. As will be readily seen, the means for elevating 20 may also function as a means for lowering in lowering a metallic wheel from the means for conveying 18 to the supporting surface 17. A control panel means, generally illustrated as 22, has control knobs 22k, control pedals 22p and control buttons 22b for hydraulically or pneumatically controlling the operation of the means for elevating 20, the means for conveying 18, the means for cleaning 14, and the means for washing 12, and is in communication (i.e. either hydraulically, pneumatically, or the like) with all of the same in order to accomplish the controlling and the operating.

Figure 32:
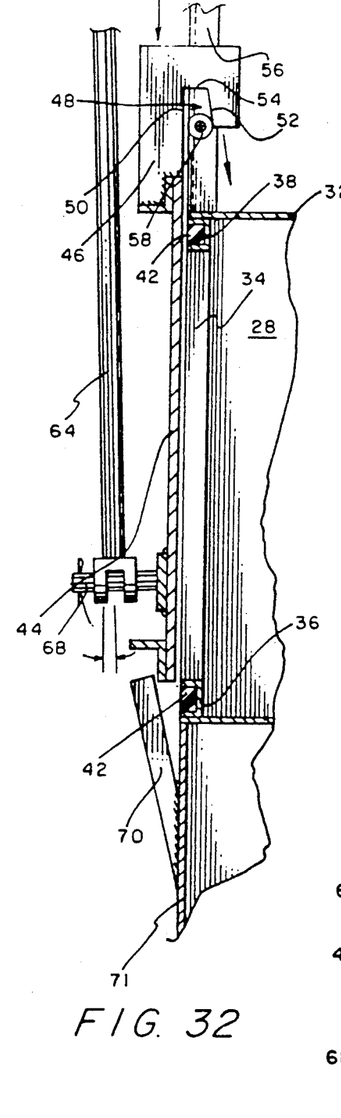
FIG. 32 is a partial vertical sectional view disclosing the piston driving the door downwardly with the door initially coming into contact with the door sill and the pair of lower wedge guide rails.
Figure 33:
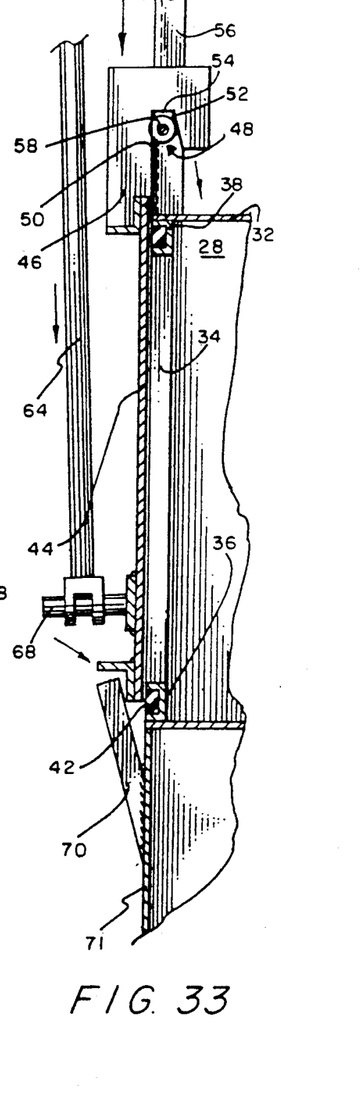
FIG. 33 is a partial vertical sectional view disclosing the piston driving the door downwardly wherein the bottom of the door is halfway down the door sill and slidably engaged to the pair of wedge guide rails.
Figure 34:
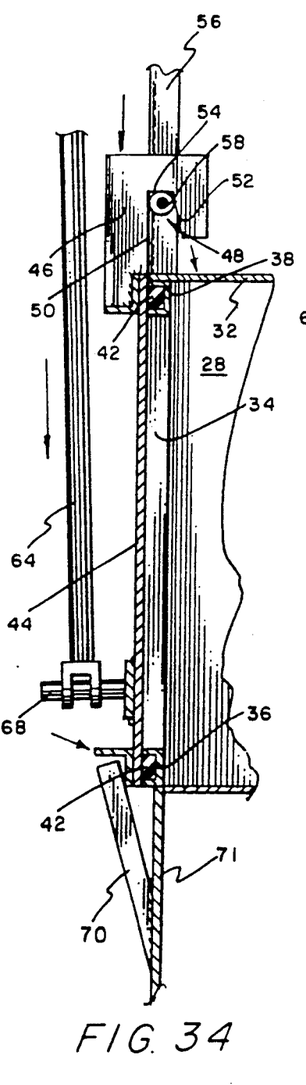
FIG. 34 is a partial vertical sectional view disclosing the piston as having driven the door completely down such that the bottom of the door registers with the bottom of the door sill and is wedged in between the pair of wedge guide rails and the door sill.
Figures 35, 36:
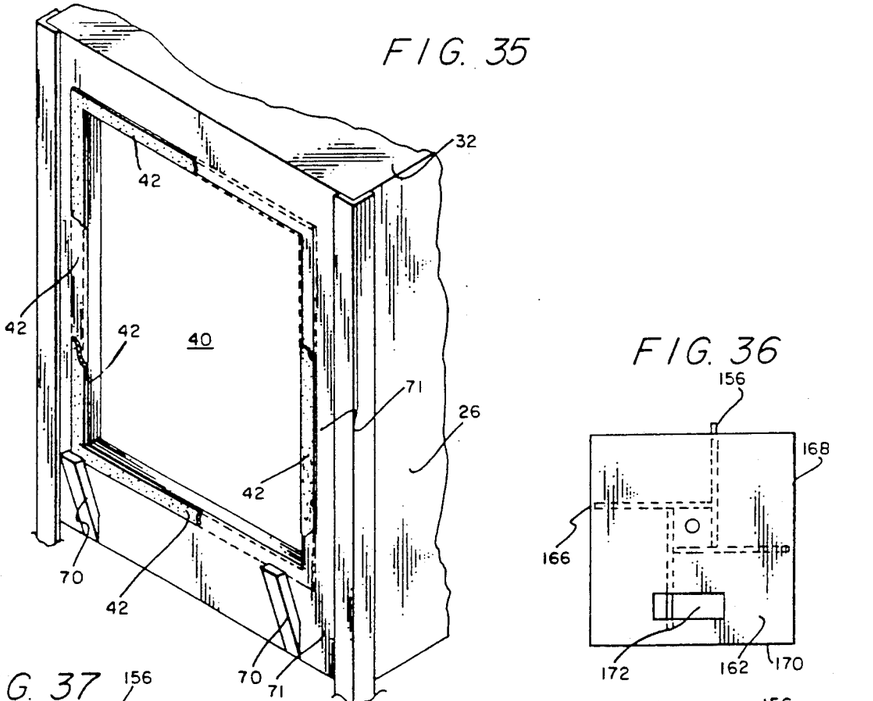
FIG. 35 is a partial perspective view disclosing the door opening having a solid perimeter surrounding it along with a sealant disposed along the solid perimeter.
FIG. 36 is a partial vertical sectional view taken in direction of the arrows and along the plane of line 36—36 in FIG. 17.
Figure 37:
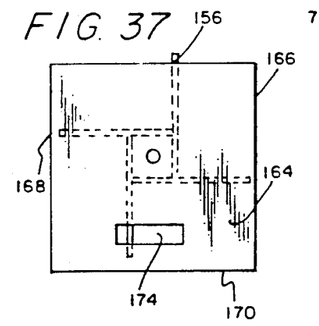
FIG. 37 is a partial vertical sectional view taken in direction of the arrows and along the plane of line 37—37 in FIG. 17.
Figure 38:
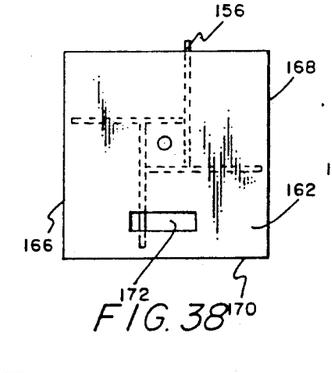
FIG. 38 is a partial vertical sectional view taken in direction of the arrows and along the plane of line 38—38 in FIG. 17.
Figure 39:
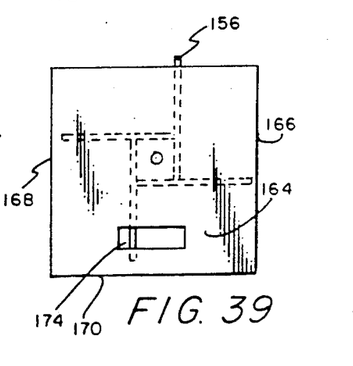
FIG. 39 is a partial vertical sectional view taken in direction of the arrows and along the plane of line 39—39 in FIG. 17.

The means for washing 12 of this invention is an apparatus for washing a metallic wheel 11 and the like (see FIGS. 1-9 and 30—35) having a washing chamber, generally illustrated as 24 in FIG. 3, that comprises spaced side walls 26 and 28 that are joined by a rear wall 30. The washing chamber 24 also has a top wall 32 and a pair of door jambs 34—34 that is integrally bound to the spaced side walls 26 and 28. A door sill 36 and a door lintel 38 are both secured to the door jambs 34—34 and are preferably U-shape in cross-section as illustrated in FIGS. 32-34. Similarly although not readily discernible from the drawings, the door jambs 34—34 are also preferably U-shape in cross-section. The door jambs 34—34, the door sill 36 and the door lintel 38 form a door opening, generally illustrated as 40. Alternatively, the door jambs 34—34, the door sill 36 and the door lintel 38 may all be integral such that the door opening 40 has a solid perimeter with no individual door jambs 34—34, sills 36 or lintels 38 (see FIG. 35). A sealant or gasket means 42 (see FIGS. 32-35) is disposed within the U-shaped jambs 34—34, U-shaped sill 36 and lintel 38, or along the solid perimeter (see FIG. 35), to provide an essentially air-tight seal around the door opening 40 when a door 44 covers slidably the door opening 40.

Attached to the upper part of the door 44 is an upper wedge 46 that is generally L-shaped with a wedge recess, generally illustrated as 48. Wedge recess 48 has recess sidewall 50 and 52 and a recess bottom wall 54 that joins the recess sidewalls 50 and 52 together. Recess side wall 52, as illustrated in FIGS. 4 and 32-34, forms an angle with the recess bottom wall 54 that is greater than 90 degrees but less than 180 degrees. Recess side wall 50 is essentially normal or perpendicular with respect to the recess bottom wall 54.

A pair of wedge guide rails 56—56 attach to the washing chamber 24, more specifically to the top wall 32, and extend upwardly therefrom. The lower part of the wedge guide rails 56—56 is joined together by a wedging bar 58 which lodges within the wedge recess 48 when the door 44 is closed. Sandwiched between and attached to the pair of guide rails 56—56 in the upper part thereof is a support plate 60 that has pivotally depending therefrom a cylinder 62 that includes slidably disposed therein a piston 64 that is raised or lowered from within the cylinder 62 either hydraulically or pneumatically. A pair of slanting brace bars 66—66 respectively connect to the top of the pair of wedge guide rails 56—56 and extend down to connect with the top wall 32 for bracing the wedge guide rails 56—56. A lug bar 68 is mounted on the door 44 and slidably engages the end of the piston 64 as illustrated in FIGS. 32-34. The lug bar 68 has a lug axis that is angularly disposed downwardly at an angle (See FIG. 31) with respect to a horizontal plane such that the lug bar 68 is not horizontal and protrudes away and downwardly from the door 40. The angle is preferably from about ½ degree to about 10 degrees. As will be further explained below, the angular disposition of the lug bar 68 assist in sealing shut the door 44. To also assist in sealing shut the door 44, a pair of lower wedges 70—70 attach to a bottom face 71 of the washing chamber 24 below the door sill 36, as illustrated in FIGS. 30-34, and protrudes upwardly and away therefrom such that the bottom of the door 44 can be wedged in tightly between the lower wedges 70—70 and the door sill 36. The angular disposition of the lug bar 68 enables the piston 64 to slide towards the front of the lug bar 68 and obtain better leverage in wedging the bottom of the door 44 between the lower wedges 70—70 and the door sill 36 and against the sealant 42. As the cylinder 62 raises and lowers the piston 64 in order to raise and lower the door 44, a pair of door guide rails 72—72, which is secured to the washing chamber 24 (more specifically to the door jambs 34—34), guide the sides of the door 44 in order to keep the door 44 aligned with the planer surface of the front of the washing chamber 24.

Figure 10:
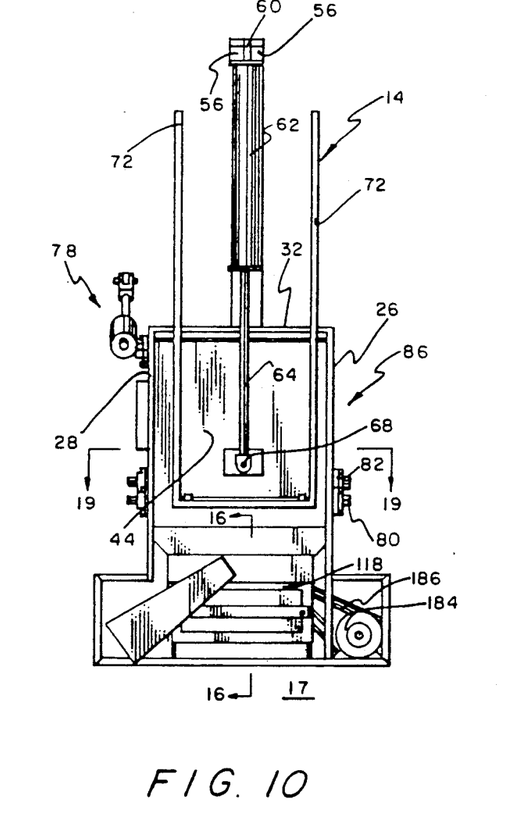

A discharge shaft 74 is rotatably mounted to the sidewalls 26 and 28 of the washing chamber 24 and a generally T-shaped discharge bar 76 is bound to the discharge shaft 74 and is rotatable therewith. A hydraulic or pneumatic means, generally illustrated as 78 in FIGS. 3, 10 and 11, is mounted on sidewall 28 and engages the discharge shaft 74 to rotate the same and cause the generally T-shaped discharge bar 76 to push or move a metallic wheel 11 from the washing chamber 24. The combination of the T-shaped discharge bar 76, the discharge shaft 74 and the hydraulic or pneumatic means 78 represents a means for discharging a metallic wheel 11 from the washing chamber 24.

Mounted also to the sidewalls 26 and 28 in addition to the discharge shaft 74 are support cylinders 80 and 82 which represent a means for supporting a metallic wheel 11. The support cylinders 80 and 82 are generally parallel with respect to each other with support cylinder 80 (the closest to the door opening 40) being positioned lower than support cylinder 82 which acts or provides an abutment for a metallic wheel 11 that is rolled into the washing chamber 24. Cylinder 82 stops the forward roll of a metallic wheel 11 when pushed into the washing chamber 24.

Figure 19:
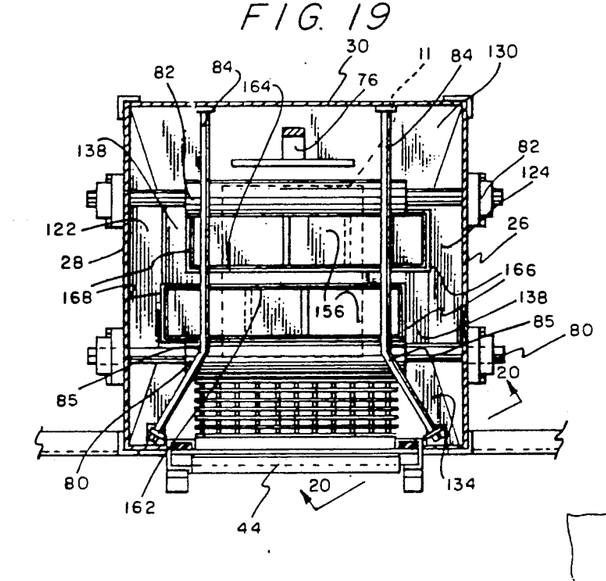
FIG. 19 is a partial horizontal sectional view taken in direction of the arrows and along the plane of line 19—19 in FIG. 10.
Figure 20:
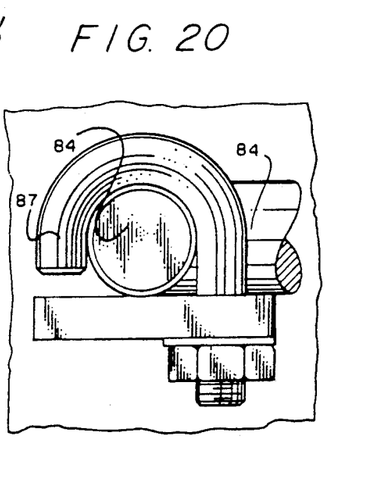
FIG. 20 is a partial vertical sectional view taken in direction of the arrows and along the plane of line 20—20 in FIG. 19.

Mounted to the rear wall 30 of the washing chamber 24 are at least two positioning bars 84 (see FIGS. 3, 8 and 19) for maintaining a metallic wheel 11 in an upright position while the same is being washed. In a preferred embodiment of the present invention, there are four positioning bars 84—84—84—84 secured to the rear wall 30, with two positioning bars 84—84 on one side of the washing chamber 24, and two positioning bars 84—84 on the other side of the washing chamber 24 and parallel respectively with the other or first mentioned two positioning bars 84—84. The positioning bars 84—84 and 84—84 extend outwardly and generally perpendicular from the rear wall 30 and structurally diverge or flare at 85 (see FIGS. 8 and 19) toward the door opening 40 and secures to the door jambs 34—34 with hooks 87 as illustrated in FIG. 20. A metallic wheel 11 is supported by the support cylinders 80 and 82 between the two sets of positioning bars 84—84 and 84—84 such that a metallic wheel 11 is maintained in an upright position while being washed. The diverged or flared positioning bars 84—84—84—84 provide a funneling effect to facilitate the pushing or rolling of a metallic wheel 11 into the washing chamber 24. The T-shaped discharge bar 76 is pivoted between the two sets of positioning bars 84—84 and 84—84 by the rotatably driven discharge shaft 74 in order to roll a metallic wheel 11 out of the washing chamber 24 onto the means from conveying 14 for transportation down to the means for cleaning 14 which has a cleaning chamber, generally illustrated as 86 in FIGS. 10 and 11. Control of the hydraulic or pneumatic means 78 that rotatably drives the discharge shaft 74 is from the control panel 22.

As was prveiously mentioned, similar parts of the present invention are identified by like reference numerals; and because of such identification, the elements of the washing chamber 24 that are common with the cleaning chamber 86 will be identified by the same reference numeral. The following previously described elements (and their limitations) for the washing chamber 24 are part of or included within the cleaning chamber 86, and for a detailed description of how the following elements (and their limitations) operate and cooperate in the cleaning chamber 86, reference should be made to the foregoing discussion of the washing chamber 24 because they are all identical: spaced side walls 26 and 28; rear wall 30; top wall 32; door jambs 34—34; door sill 36; door lintel 38; door opening 40; sealant or gasket means 42; door 44; upper wedge 46; wedge recess 48; recess sidewalls 50 and 52; recess bottom wall 54; wedge guide rails 56—56; wedging bar 58; support plate 60; cylinder 62; lug bar 68; lower wedges 70—70; bottom face 71; door guide rails 72—72; discharge shaft 74; T-shaped discharge bar 76; hydraulic or pneumatic means 78; support cylinders 80 and 82; and positioning bars 84—84—84—84.

Beneath and in communication with the washing chamber 24 is a washing reservoir, generally illustrated as 90, having a reservoir bottom 92 that joins a pair of end reservoir walls 94—94 and a pair of side reservoir walls 96—96. One of the end reservoir walls 94 is formed integrally with spaced side wall 28 whereas the other end reservoir wall 94 is joined to the spaced side wall 26 by a reservoir top wall 98 that also partially joins the pair of side reservoir walls 96—96. Extending through the top wall 32 is a vent stack 99 to vent out into the atmosphere heat and moisture. The washing reservoir 90 contains a washing fluid 100. The reservoir top wall 98 supports a pump 102 that is in communication with the washing fluid 100 and a discharge conduit 104 mounted on the spaced side walls 26 and 28 such that the pump 102 pumps washing fluid 100 through the discharge conduit 104. Nozzles 106 are secured to the end of the discharge conduit 104 at select locations in order direct and pressurize existing washing fluid 100. A strainer 108 is disposed within the washing reservoir 90 as illustrated in FIG. 3 such as to filter or strain the washing fluid 100 before being pumped by pump 102. As also illustrated in FIG. 3, a heater, generally illustrated as 110, is disposed within the washing fluid 100 to heat the same before it is pumped by pump 102. The heater 110 comprises a cylindrical heating conduit 112 in direct communication with a gas stove 114 or the like that emits a hot flame into the cylindrical heating conduit 112. The structure of the cylindrical heating conduit 112 defines a plurality of transverse hollow conduits 116 (see FIGS. 6 and 7) that extend diametrically and transversely through the hollow structure of the cylindrical heating conduit 112 such that washing fluid 100 can pass therethrough and be heated by the hot flame that emanates from the gas stove 114.

Figure 12:
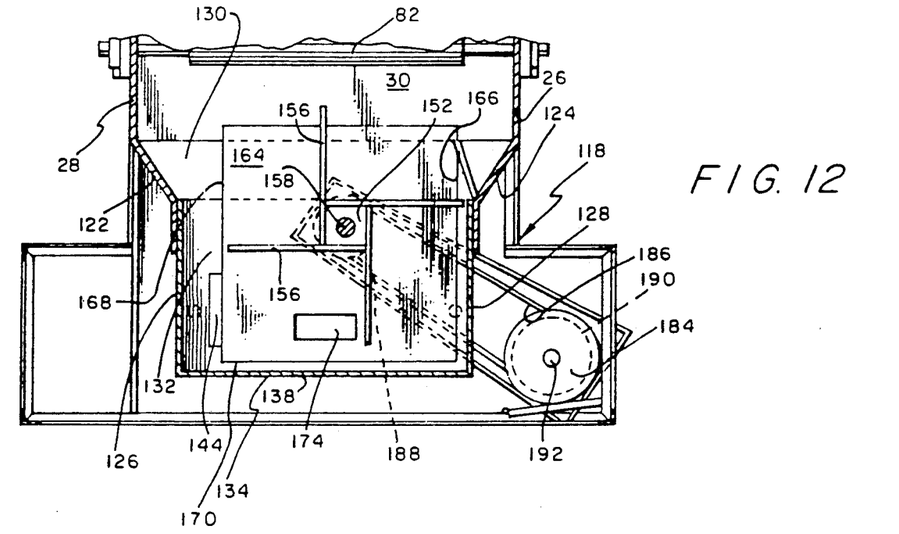
FIG. 12 is a vertical sectional view taken in direction of the arrows and along the plane of line 12—12 in FIG. 11.
Figure 13:
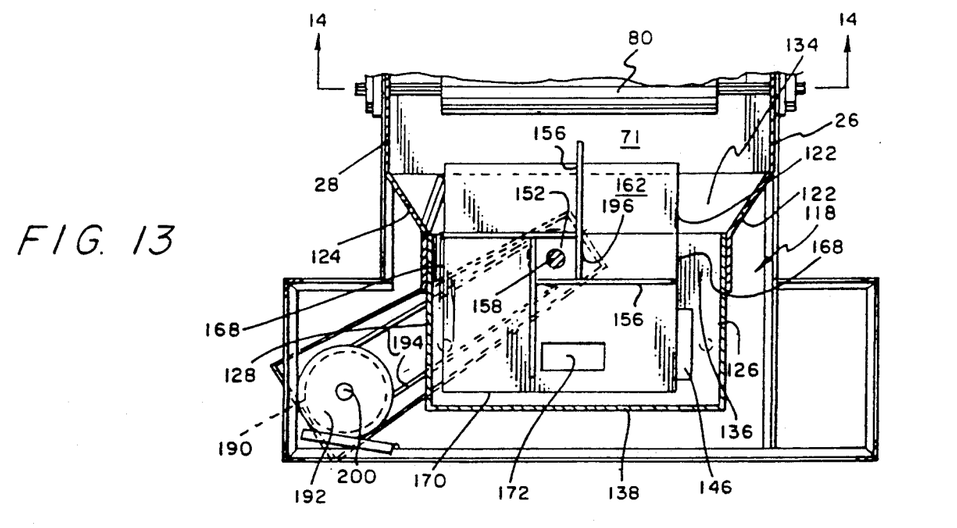
FIG. 13 is a vertical sectional view taken in direction of the arrows and along the plane of line 13—13 in FIG. 11.
Figure 14:
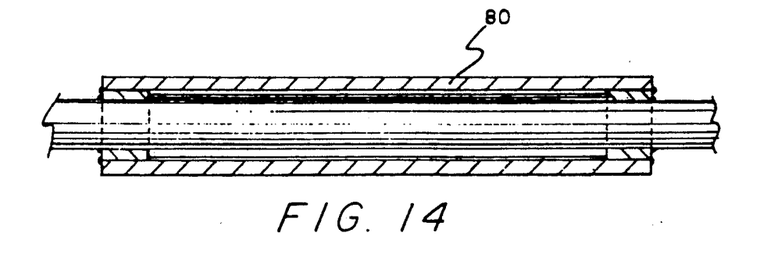
FIG. 14 is a horizontal sectional view taken in direction of the arrows and along the plane of line 14—14 in FIG. 13.
Figures 15, 16:
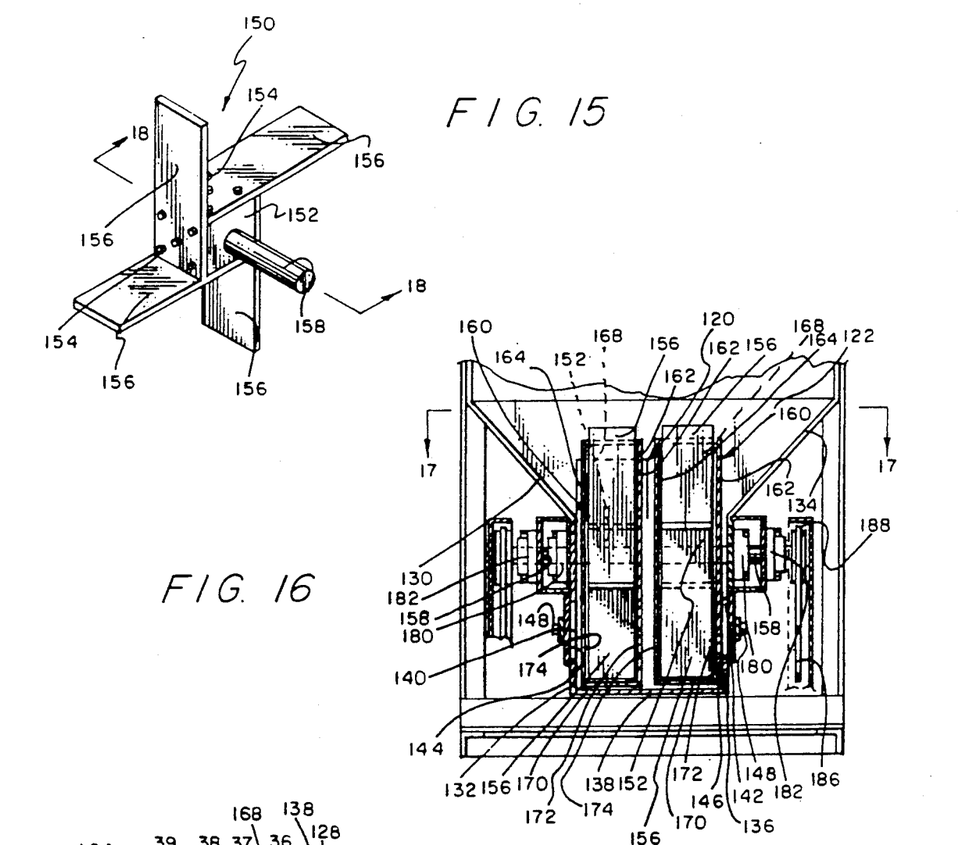
FIG. 15 is a perspective view of the impeller wheel of this invention.
FIG. 16 is a partial vertical sectional view taken in direction of the arrows and along the plane of line 16—16 in FIG. 10.
Figure 17:
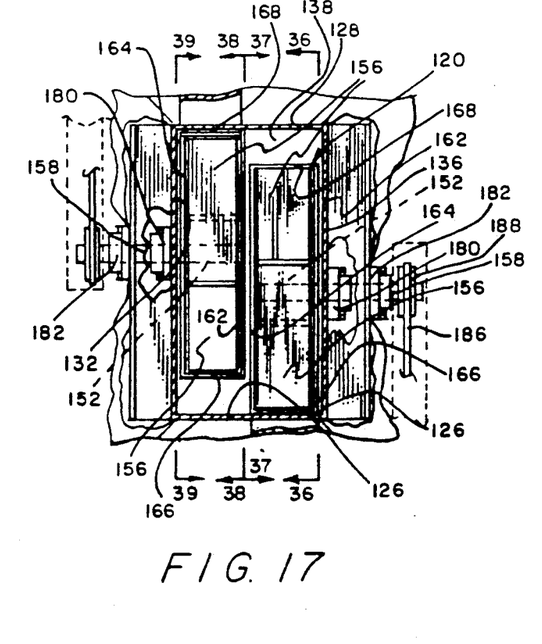
FIG. 17 is a horizontal sectional view taken in direction of the arrows and along the plane of line 17—17 in FIG. 16.
Figure 18:
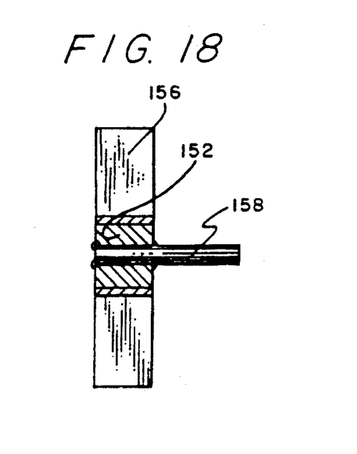
FIG. 18 is a partial horizontal sectional view taken in direction of the arrows and along the plane of line 18—18 in FIG. 15.

Underneath and in communication with the cleaning chamber 86 of the means for cleaning 14, and included within the latter, is a well or sump structure, generally illustrated as 118, in which there is disposed a shot feeding and impeller means, designated generally at 120 (See FIGS. 16 and 17). As best shown in FIGS. 12, 13 and 19, the lower end portion of the cleaning chamber 86 is defined by downwardly converging side walls 122 and 124 constituting integral and inclined downward extensions of the sidewalls 26 and 28 respectively that join or attach to or with upstanding end walls 126 and 128 of the sump structure 118. The rear wall 30 has an integral downwardly inclined rear wall portion 130 joining the inclined side walls 122 and 124 and joined to the upper end of a rear or sidewall 132 of the sump structure 118. The cleaning chamber 86 also includes a downwardly and rearwardly inclined front wall 134 that connects the inclined sidewalls 122 and 124 and which extends from the bottom face 71 to join a front or side wall 136 of the sump structure 118.

The sump structure 118 includes a bottom wall 138 peripherally joined to the lower edges of the walls 126, 128, 132 and 136. As best shown in FIG. 16, the lower portions of the walls 132 and 136 are provided with access openings 140 and 142 respectively that are normally closed by plates 144 and 146 respectively secured by releasable fasteners 148.

The shot feeding and impeller means 120 that is disposed within the sump structure 118 comprises a pair of bladed impeller wheels 150—150 (see FIG. 15). Each bladed impeller wheel 150 has a square hub 152 on which are mounted by fastener 154 a plurality of radially extending blades 156. The square hub 152 is bound to a shaft 158 in order to rotate therewith. It will be noted that the blades 156 are radially offset from alignment with the center of the hub 152, and therefore extend radially from the center of the impeller wheel 150 while being inclined to the radius of the wheel 150. As seen in FIG. 16 and FIG. 17 the center of the two hubs 152—152 (or the respective longitudinal axis through the shafts 158—158) are generally in or lie on the same horizontal plane but are offset with respect to each other such that the centers of the respective hubs 152 do not collimate or, stated alternatively, the respective longitudinal axis through the shafts 158—158 or through the center of the hubs 152—152 do not register coaxially and are therefore not aligned. It has been discovered that by offsetting the two bladed impeller wheels 150—150 as such, a metallic wheel 11 can be cleaned abrasively with shot faster and better than if only one bladed impeller wheel 150 was utilized as taught in commonly owned U.S. Pat. No. 3,797,174 or if two bladed impeller wheels 150—150 were used but in a non-offset position with the center of the hubs 152—152 being coaxial. It has been discovered that this is especially true if the pair of bladed impeller wheels 150—150 are set to rotate in opposite directions when viewed in the same direction; that is, one bladed impeller wheel 150 rotates clockwise while the other bladed impeller wheel 150 rotates counterclockwise.

Figure 40:
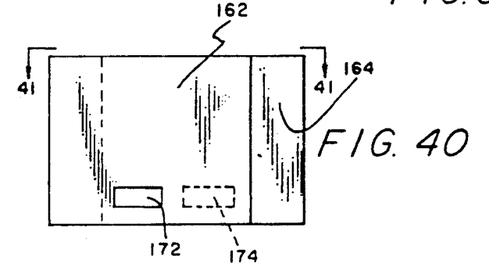
FIG. 40 is a partial vertical view disclosing the wall of one impeller contiguous to the wall of the other impeller with the shot access opening of the former wall not being aligned or registered with the shot access opening of the latter wall.
Figure 41:
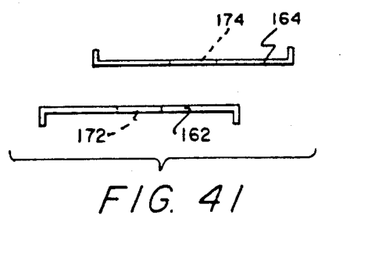
FIG. 41 is a partial horizontal view taken in direction of the arrows and along the plane of line 41—41 in FIG. 40.

Each bladed impeller wheel 150 is housed in an impeller housing, generally illustrated as 160, that is open at the top. As best seen in FIGS. 16 and 17, each impeller housing 160 has a pair of sidewalls 162 and 164 that are joined together by a pair of end walls 166 and 168. Each impeller housing 160 includes a bottom wall 170 peripherally joined to the lower edges of the walls 162, 164, 166 and 168. As illustrated in FIG. 16 the walls 162, 164,.166 and 168 extend up and beyond the juncture points of walls 122, 124, 130 and 134 with upstanding end walls 126 and 128 and side walls 132 and 136, respectively, of the sump structure 118. The lower portion of each of the sidewalls 162 and 164 are provided with shot access openings 172 and 174 respectively that are normally open so that shot can enter the impeller housing 160 (see FIGS. 36-39). The purpose for the extensions of the walls 162, 164, 166 and 168 above the juncture points of the same with walls 126, 128, 132 and 136, respectively, is to insure that the majority of the shot does not enter the impeller housing 160 from its open top, but through shot access openings 172 and 174 in the sidewalls 162 and 164, respectively. To further ensure that the majority of the shot properly enters shot access openings 172 and 174, the distance of wall 162 of one impeller housing 160 from wall 136 of the sump structure 118 and of the distance of wall 164 of the other impeller housing 160 from wall 132 of the sump structure 118 should be from about ¼ inch to about 8 inches, depending on the size of the shot. Similarly, the distance of wall 162 of one impeller housing 160 from wall 164 of the other impeller housing 160 should also be from about ¼ inch to about 8 inches. Any distance less than ¼ inch could prevent shot from passing between the two impeller housings 160—160 and between one of the impeller housing 160 and any walls 132 and 136 of the sump structure 118. Any distance larger than 8 inches could cause the use of too many shot and would effect the efficiency of the shot passing through any of the shot access openings 172 and 174 since the angular disposition of shot with respect to access openings 172 and 174 decreases as the distance increase. Stated alternatively, as the distance decreases, the stacking base (i.e the number of shot on the bottom wall 138 and between any wall (i.e 136 or 132) of the sump structure 118 and any wall (i.e 162 or 164) of the impeller housing 160 or between wall 162 and 164 of two impeller housing 160) decreases such that the slope of the shot imposed upon each other increases; this would enable the shot to roll or pass efficiently through the shot access openings 172 and 174 as to opposed to when the distance increases. It should be noted as illustrated in FIGS. 40 and 41 that shot access opening 172 in wall 162 of one impeller housing 160 and shot access opening 174 in wall 164 of the other impeller housing 160 are not directly opposed to each other, or, stated alternatively, these shot access opening 172 and 174 do not directly face each other by being registered or aligned in plane perpendicular or normal to the walls 162 and 164. The shot access openings 172 and 174 are offset with respect to each other in order to increase the efficiency of stacked shot entering the two impeller housings 160—160 through shot access openings 172 and 174.

The shafts 158—158, upon which the hub 152 is mounted on each are horizontally disposed to extend perpendicularly through wall 162 of one impeller housing 160 and through wall 164 of the other impeller housing 160. The shafts 158—158 are journaled in bearings 180—180 and 182—182. Bearings 180—180 are carried by walls 132 and 136 of the sump structure 118. One of the shafts 158 is driven to rotate anticlockwise by means of an electric motor 184 supported by foundation 17 and an endless belt 186 entrained over a pulley 188 and 190 fixed to the shaft 158 and to an output shaft 192 of the electric motor 184 (see FIG. 12), respectively. The other shaft 158 is driven to rotate clockwise by means of an electric motor 192 supported by foundation 17 and an endless belt 194 entrained over a pulley 196 and 198 fixed to the shaft 158 and to an output shaft 200 of the electric motor 192 (see FIG. 13), respectively.

It is to be understood that shot fed into the impeller housings 160—160 through shot access openings 172 and 174 will be propelled upwardly into the cleaning chamber 86 by the impeller or wheel 150 and that such shot upon its kinetic energy being spent, will gravitationally descend off of sloping walls 122, 124, 130 and 134 and into the sump structure 118. As previously indicated, shot will lodge between wall 162 of one impeller housing 160 and wall 164 of the other impeller housing 160, as well as between wall 162 of one impeller housing 160 and wall 136 of the sump structure 118 and between wall 164 of the other impeller housing 160 and wall 132 of the sump structure 118. Such lodged shot will again enter through shot access openings 172 and 174 by gravitational rolling after enough shot is stacked and lodged. Some of the shot after its kinetic energy has been dissipated will fall from directly above down into the impeller housing 160—160 through the open tops thereof. Such directly falling shot is largely contacted immediately and again propelled upwardly by the impeller wheel 150.

The means for conveying 18 comprises a conveying frame 202 that is supported by foundation 17. The conveying frame 202 supports rotatably through bearings 204 and 205 a pair of transport cylinders 206 and 208. Bound to the end of transport cylinders 206 and 208 are pulleys 210 and 212, respectively. The transport cylinders 206 and 208 are driven to rotate in the same direction (i.e. either clockwise or counterclockwise) by means of an electric motor 214 secured to conveying frame 202 and an endless belt 216 entrained over pulleys 210 and 212 and a pulley 218 fixed to an output shaft 220 of the electric motor 214.

Figure 23:
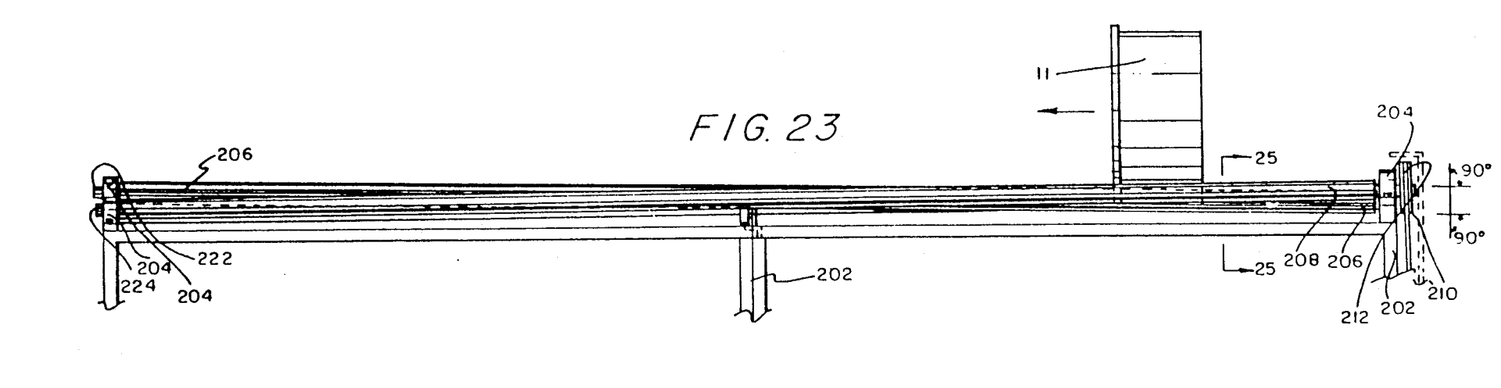
FIG. 23 is a partial front elevational view of the pair of rotatable cylinders which provide the means for transportation of the metallic wheels.
Figures 24, 25:
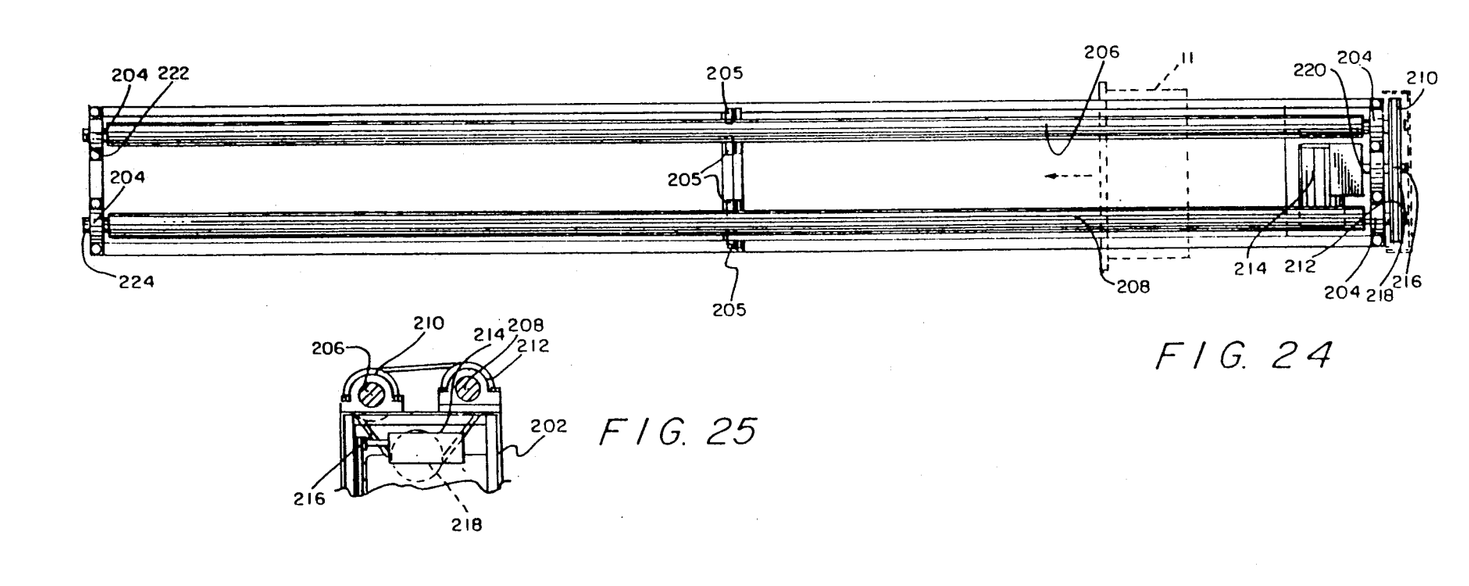
FIG. 24 is a top plan view of the pair of rotatable cylinders of FIG. 23.
FIG. 25 is a partial vertical sectional view taken in direction of the arrows and along the plane of line 25—25 in FIG. 23.

Transport cylinder 206 terminates in an end 222 that is opposed to the end of the transport cylinder 206 that includes pulley 210. Similarly, transport cylinder 208 terminates in an end 224 that is opposed to the end of the transport cylinder 208 that includes pulley 212. As illustrated in FIGS. 2 and 23 and 25, the end of transport cylinder 206 having pulley 210 is lower than the end of transport cylinder 208 having pulley 212. Likewise, end 222 of transport cylinder 206 is higher than end 224 of transport cylinder 208. Thus, the longitudinal axis of both transport cylinders 206 and 208 are angularly disposed with respect to a horizontal plane. Stated alternatively, as illustrated in FIG. 23, the longitudinal axis of both transport cylinders 206 and 208 defines an angle with a vertical plane that is less than 90°, preferably from aobut 75° to about 89°. Such longitudinal and/or angular disposition of the transport cylinders 206 and 208 along with rotating the two transport cylinders 206 and 208 in the same direction (e.g. counterclockwise) enable a metallic wheel 11 to be transported or moved by the cylinder 206 and 208, as illustrated in FIG. 23.

Figure 21:
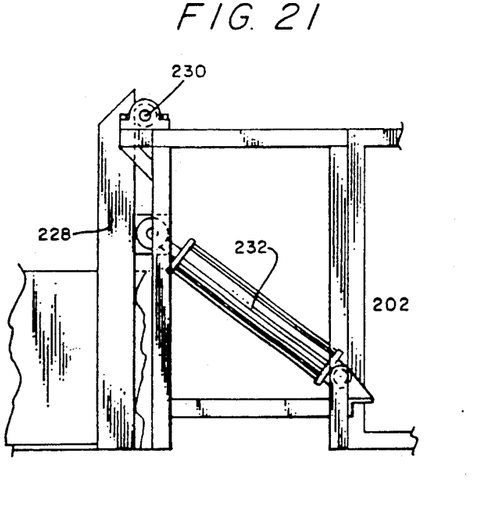
FIG. 21 is a partial vertical sectional view taken in direction of the arrows and along the plane of line 21—21 in FIG. 1.
Figure 22:
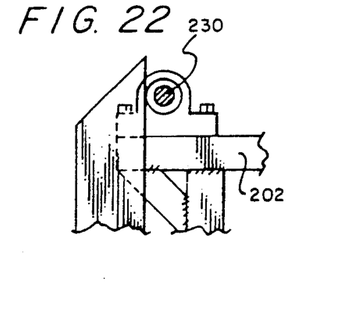
FIG. 22 is a partial vertical sectional view taken in direction of the arrows and along the plane of line 22—22 in FIG. 1.

As was previuosly indicated, the means for elevating 20 is pivotally secured to the means for conveying 18, and is controlled from the control board 22. In a preferred embodiment of the invention, the means for elevating 20 comprises an L-shaped platform 228 pivotally secured at 230 to or upon the conveying frame 202. A hydraulic or pneumatic cylinder 232 (see FIG. 21) interconnects L-shaped platform 228 with conveying frame 202. Cylinder 232 can be activated from control panel 22 such that when a metallic wheel 11 is rolled along the foundation 17 and into the L-shaped platform 228, the L-shaped platform 228 may be raised by cylinder 232.

When the L-shaped platform 228 reaches a generally horizontal position as indicated by dotted lines in FIG. 2, a metallic wheel 11 may be manually rolled off of the platform 228 and onto the pair of transport cylinders 206 and 208, or rolled over the pair of transport cylinders 206 and 208 and into the washing chamber 24 or the cleaning chamber 86. Preferably, there are three L-shaped platforms 228—228—228 disposed pivotally along the conveying frame 202. One L-shaped platform 228 pivots to the conveying frame 202 in front of the washing chamber 24. Another L-shaped platform 228 pivots to the conveying frame 202 in front of the cleaning chamber 86. A third L-shaped platform 228 pivots to the conveying frame 202 outside of the housing 16, all as illustrated in FIG. 1.

Figure 26:
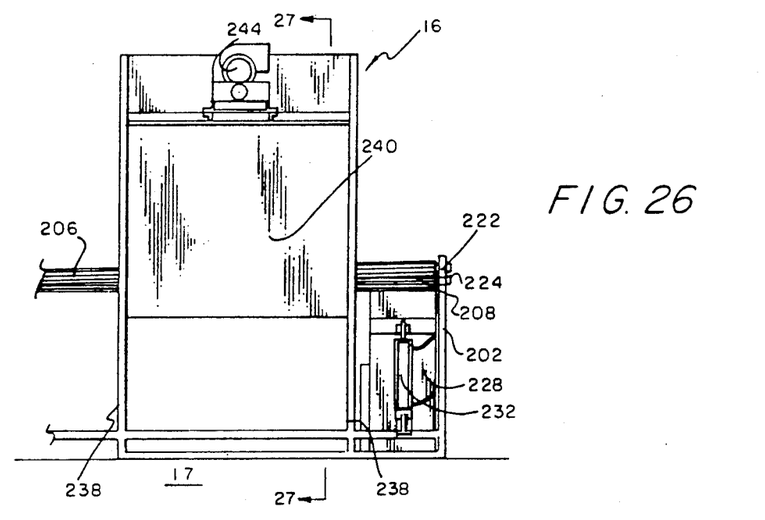
FIG. 26 is a back elevational view of the house wherein a washed and cleaned metallic wheel may be painted.

As best illustrated in FIGS. 26—28 the housing 16 where a metallic wheel 11 may be painted comprises a pair of lights 234—234 to illuminate the area. The lights 234—234 are secured underneath a roof 236 of the housing 16 which additionally comprises support legs 238—238—238—238 that are supported by foundation 17. The housing 16 further comprises a back 240 having a structure defining an opening 242 (see FIG. 27) that is in communication with a vent or suction means 244 to suck or withdraw paint fumes from inside of the housing 16. A filter 246 (see FIGS. 27 and 28) is disposed within the backing 240 such as to filter the paint fumes and air passing to the suction means 244 from within the housing 16. After a metallic wheel 11 has been painted and the paint has dried, the L-shaped platform 228 immediately outside of housing 16 may be elevated to a horizontal position to receive a painted metallic wheel 11 by the latter being rolled off of the pair of transport cylinders 206 and 208 and onto the L-shaped platform 228. From the horizontal position, the L-shaped platform 228 may be lowered (by the operator engaging the appropriate pedal 22p, button 22b, or knob 22k on the control panel 22) to a vertical position such that the painted metallic wheel 11 can be rolled off of the L-shaped platform 228 and along the foundation 17. With continuing reference to the drawings for operation of the invention and the method for washing and cleaning a metallic wheel, a metallic wheel 11 is rolled along the foundation 17 until resting upon the L-shaped platform 228 immediately in front of the means or apparatus for washing 12. The operator subsequently engages the appropriate button 22b, knob 22k, or pedal 22p in order to elevate the platform 228 from its vertical position to the horizontal or dotted line position of FIG. 2. The metallic wheel 11 is subsequently rolled longitudinally along the platform 228 onto and over the pair of transport cylinders 206 and 208, and into the washing chamber 24. As previously indicated, the positioning bars 84 provide a funneling or guiding effect to position the metallic wheel 11 properly in an upright position while resting upon the pair of support cylinders 80 and 82. After the metallic wheel has been properly disposed within the washing chamber 24, the appropriate button 22b or knob 22k or pedal 22p is engaged by the operator in order to cause cylinder 62-piston 64 to lower the door 44 that covers the door opening 40 of the washing chamber 24. The L-shaped platform 228 may also be lowered by the operator back to its original vertical position.

In the washing chamber 24, the metallic wheel 11 is washed by the operator turning on or energizing the pump 102 such that heated washing fluid 100 is emitted through the nozzles 106. It is to be understood that the washing fluid 100 has been previously heated by the heater 110. After the metallic wheel 11 has been sufficiently cleaned, the operator engages the appropriate 22b or knob 22k or pedal 22p to raise the door 44, and subsequently, energizes pneumatic or hydraulic cylinder 78 such that the discharge shaft 74 is rotated clockwise causing the discharge bar 76 to pass or pivot between the positioning bars 84 and push, roll or move the washed metallic wheel 11 off of the support cylinders 80 and 82 and out of the washing chamber 24. The washed metallic wheel 11 is subsequently transported by the rotating pair of transport cylinders 206 and 208 towards the cleaning chamber 86. As was previously indicated, the transport cylinders 206 and 208 rotated in the same direction and are angularly disposed with respect to a horizontal plane such that contiguous ends of the transport cylinders 208 and 206 are not at the same elevation. To rotate the transport cylinders 206 and 208 in the same direction, the operator energizes electric motor 214. This energization may be from the control panel 22 or at a separate switch distantly placed from the control panel 22.

When the washed metallic wheel 11 arrives in front of the cleaning chamber 86, the door 44 is elevated or caused to be open by the operator from or at the control panel 22, and the operator pushes the washed metallic wheel 11 between positioning bars 84 to rest the washed metallic wheel 11 upon the support cylinders 80 and 82. The operator causes the door 44 to close, and activates or energizes the electric motors 184 and 192 to start the impeller wheels 150—150 rotating. As the impeller wheels 150—150 pick up speed, shot is impelled upwardly against the washed mechanical wheel 11 in order to abrasively clean the washed metallic wheel 11. As illustrated in FIG. 19, the offset of one impeller wheel 150 with respect to the other impeller wheel 150 enables one impeller wheel 150 to clean one side of the metallic wheel 11 better than the other impeller wheel 150, and vice versa. If the impeller wheels 150—150 were not offset, the metallic wheel 11 would not be cleaned sufficiently or effectively as when the two impeller wheels 150—150 are offset because the impelled shot can not reach all of the internal areas of the metallic wheel 11 as when the impeller wheels 150—150 are offset.

After the washed metallic wheel 11 has been cleaned abrasively, the pneumatic or hydraulic cylinder 78 is energized by the operator after the door 44 is open, and the discharged shaft 74 rotates in order for the discharge bar 76 to contact an end of the cleaned and washed metallic wheel to roll the latter out of the cleaning chamber 86 and onto the rotating pair of cylinders 206 and 208. The rotating pair of cylinders 206 and 208 transport the cleaned and washed metallic wheel down to and into the house 16 wherein the rotation of the pair of cylinders 208 and 206 may be stopped in order that the cleaned and washed metallic wheel 11 can be painted by the operator. As indicated in FIG. 27, the paint fumes from the house 16 may be removed by vent motor or suction means 244 while the cleaned and washed metallic wheel 11 is being painted upon the non-rotating transport cylinders 206 and 208. After the metallic wheel 11 has been painted and the paint has dried, the painted metallic wheel 11 is further transported by the rotating pair of transport cylinders 206 and 208 until the painted metallic wheel 11 is juxtaposed to the L-shaped platform 228 positioned at the end of the rotating transport cylinders 206 and 208 and immediately outside of the house 16. Rotation of the transport cylinders 206 and 208 may be stopped by the operator and the L-shaped platform 228 is elevated to a generally horizontal position such that the painted metallic wheel 11 may be rolled from or off of the pair of transport cylinders 206 and 208 and onto the horizontally disposed L-shaped platform 228. Subsequently, this L-shaped platform 228 may be lowered by the operator from the control panel 22 until the same has reached the general vertical position where the painted metallic wheel 11 may be conveniently rolled off of the L-shaped platform and along the foundation 17 to its eventual desired location.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method of washing a metallic wheel comprising the steps of:
   a) elevating a metallic wheel from a supporting surface to a higher level;
   b) conveying a metallic wheel along a predetermined path substantially along the higher level toward a washing chamber;
   c) rolling the metallic wheel transversely away from the predetermined path into the washing chamber;
   d) washing the metallic wheel in the washing chamber; and
   e) applying an arcuately directed force against the metallic wheel to push the washed metallic wheel transversely toward the predetermined path for subsequent conveying therealong.

2. A method for washing and cleaning a metallic wheel comprising the steps of:
   a) elevating a metallic wheel from a supporting surface to a level generally horizontal to and a pair of cylinders rotatably supported by a conveying frame;
   b) rolling the metallic wheel across the pair of cylinders and into a washing chamber;
   c) washing the metallic wheel in the washing chamber; and
   d) pivoting a discharge bar means that is pivotally mounted to a pair of sidewalls of the washing chamber to push the washed metallic wheel onto the pair of cylinders.

3. The method of claim 2 additionally comprising rotating both of the cylinders in a predetermined direction to move the washed metallic wheel away from the washing chamber.

4. The method of claim 3 additionally comprising rolling the washed metallic wheel from the pair of cylinders into a cleaning chamber, and cleaning the washed metallic wheel.

5. The method of claim 4 additionally comprising pivoting a discharge bar means that is pivotally mounted to a pair of sidewalls of the cleaning chamber to push the washed and cleaned metallic wheel onto the pair of cylinders.

6. The method of claim 5 additionally comprising rotating both of the cylinders in a predetermined direction to move the washed and cleaned metallic wheel away from the cleaning chamber.

7. The method of claim 6 additionally comprising conveying the washed and cleaned metallic wheel into a housing by the pair of rotating cylinders.

8. The method of claim 7 additionally comprising painting the washed and cleaned metallic wheel.

9. The method of claim 8 wherein said cleaning of the washed metallic wheel comprises rotating a first means for impelling shot upwardly in a clockwise direction, and rotating a second means for impelling shot upwardly in a counterclockwise direction, wherein said first means for impelling shot upwardly and said second means for impelling shot upwardly are offset with respect to each other and not aligned.

10. A method for washing and cleaning a metallic wheel comprising the steps of:
    a) elevating a metallic wheel from a supporting surface to a level generally horizontal to a means, supported by a conveying frame, for conveying a metallic wheel;
    b) rolling the metallic wheel across the means for conveying a metallic wheel and into a washing chamber;
    c) washing the metallic wheel in the washing chamber; and
    d) pivoting a discharge bar means that is pivotally mounted to a pair of sidewalls of the washing chamber to push the washed metallic wheel onto the means for conveying a metallic wheel.

11. The method of claim 10 additionally comprising rolling the washed metallic wheel from the means for conveying into a cleaning chamber, and cleaning the washed metallic wheel.

12. The method of claim 11 additionally comprising pivoting a discharge bar means that is pivotally mounted to a pair of sidewalls of the cleaning chamber to push the washed and cleaned metallic wheel onto the means for conveying.

13. The method of claim 12 additionally comprising conveying the washed and cleaned metallic wheel into a housing by the means for conveying.

14. The method of claim 12 additionally comprising painting the washed and cleaned metallic wheel.

15. The method of claim 11 wherein said cleaning of the washed metallic wheel comprises rotating a first means for impelling shot upwardly in a clockwise direction, and rotating a second means for impelling shot upwardly in a counterclockwise direction, wherein said first means for impelling shot upwardly and said second means for impelling shot upwardly are offset with respect to each other and not aligned.

* * * * *